United States Patent
Bazot et al.

(10) Patent No.: US 7,469,250 B2
(45) Date of Patent: Dec. 23, 2008

(54) METHOD AND SYSTEM FOR SERVICE PROVIDERS TO PERSONALIZE EVENT NOTIFICATIONS TO USERS

(75) Inventors: Philippe Bazot, Vence (FR); Jacques Cresp, Saint Jeannet (FR); Fabrice Livigni, Mougins (FR); Richard Sert, Frejus (FR)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 11/006,117

(22) Filed: Dec. 7, 2004

(65) Prior Publication Data
US 2005/0138063 A1    Jun. 23, 2005

(30) Foreign Application Priority Data
Dec. 10, 2003   (EP)   ................... 03368114

(51) Int. Cl.
    *G06F 7/00*   (2006.01)
(52) U.S. Cl. .................. 707/100; 707/10; 709/201
(58) Field of Classification Search ............ 707/10, 707/104.1, 102, 100; 709/201, 203, 204, 709/206, 207, 238; 340/825, 825.01; 719/318
See application file for complete search history.

(56) References Cited
U.S. PATENT DOCUMENTS
5,974,449 A * 10/1999 Chang et al. ................ 709/206
6,549,904 B1 * 4/2003 Ortega et al. .................. 707/10
7,177,859 B2 * 2/2007 Pather et al. .................... 707/3
2003/0097376 A1 * 5/2003 Ortega et al. ............. 707/104.1
2003/0120775 A1 * 6/2003 York .......................... 709/224
2003/0163598 A1 * 8/2003 Wilson et al. ............... 709/318
2003/0167353 A1 * 9/2003 de Bonet et al. ............ 709/318

OTHER PUBLICATIONS

Robinson et al., Multimedia Customisation Using an Event Notification Protocol, Distributed Computing Systems Workshops, 2002. Proceedings. 22nd International Conference on, Jul. 2-5, 2002, pp. 549-554.*

* cited by examiner

*Primary Examiner*—Greta L Robinson
(74) *Attorney, Agent, or Firm*—Joseph Petrokaitis (57) ABSTRACT

Personalized notifications are delivered to end users. A service provider receives, a content description from a content provider. The content description defines keywords, values attached to each keyword and a localization of values attached to each keyword in a piece of content. Each time a subscription request for a notification service related to the received content description is received from an end user, keywords values and the delivery channels selected by the user are recorded. A notification rule associated with the end user based on the selected keyword values and the localization of the selected keyword values in the content is generated. Each time a piece of content related to the content description is received from the content provider, the received piece of content is adapted to comply with the generated rules. For each rule previously generated, the values contained in the adapted piece of content are checked against the values as defined in the rule for each localization.

14 Claims, 7 Drawing Sheets

PHASE 3

FIG.2c

EXAMPLE OF CONTENT METADATA

```
<?xml version="1.0"?>
<metadata>
<keyword name="Event" in="rss/channel/item/title,rss/channel/item/description">
<value name="UEFA Champions League">
<keyword name="Team" in="rss/channel/item/title,rss/channel/item/description">
<value name="Real Madrid"
<keyword name="Player"
    in="rss/channel/item/title,rss/channel/item/description"
    multiple="true"
    values=Zidane, Figo"/>

</value>
       .
       .
</keyword>
</value>
<value name="World Cup">
       .
       .
</value>
</keyword>
<keyword name="News Type" values="Score, Half-Time, Full-Time, General"
    in="rss/channel/item/title,rss/channel/item/description">
</metadata>
```

METHOD AND SYSTEM FOR SERVICE PROVIDERS TO PERSONALIZE EVENT NOTIFICATIONS TO USERS

TECHNICAL FIELD

The present invention relates to notification services, and more particularly to a method and system, for service providers, to deliver personalized event notifications to users.

BACKGROUND OF THE INVENTION

The service provider market moves up the value chain from pure connectivity services to high added value services able to generate revenue. In addition to the development of their customer base, service providers are now looking to increase their average revenue per user. More compelling services such as notification services promise high profit margins and greater customer satisfaction.

A notification service is a means for a service provider to inform users when an event occurs. Initially, two main methods, broadcast and group, were used.

Using the broadcast method, the service provider broadcasts the information to all of its subscribers. The method is mainly used for advertising. Generally, the content is provided by the service provider itself and not by a third party.

Using the group method, based on a demographic or another criteria, the subscriber is classified in a predefined group, and receives the event notifications aimed at the group he belongs to. For instance, when an event occurs, a human operator can send a message to members of a particular group.

Each method has its own limitations. The process is completely manual. The classification of users in groups is very coarse-grained. The user cannot personalize the notified events according to his topics of interest.

Another limitation is that an end-user cannot choose his preferred delivery channel. In most cases, the end-user has no real choice on both the content and the delivery channel.

A new technology called Intelligent Notification Services (INS), intended to solve the above limitations, has recently emerged. INS allows users to specify their preferences and to automatically notify them when an event within a predefined topic of interest occurs. This process includes steps of defining the user's content and delivery-channel preferences during the subscription process, defining rules based on the user's preferences, receiving new content provided by a content provider, and using notification engine to find the content corresponding to the user's preferences in the new available content.

Within this approach, the end-user has the ability to choose the content for which he wants to be notified and the delivery channel.

This is the first step for personalizing the notification process. An example of such service is the following: "Send me a Short Message Service (SMS) when my preferred stock hits $100."

This approach, nevertheless, has some drawbacks. A Graphical User Interface (GUI) presented to the user for his subscription is different for each content type and has to be redesigned for each new content type.

During the subscription process, the user has to enter explicitly the topics for which he wants to be notified. For example, if he wants to be notified each time the word "Barcelona" appears, at some point of the process, he will have to enter the word "Barcelona". This is a serious drawback because this declaration process is very error-prone to spelling mistakes, misinterpretation and the like, and can be very tedious especially when using mobile devices.

Selection rules need to be different based on the content type. Rules related to a news service are different from rules related to a mail service. This difference has a serious impact for the service provider. As for the GUI, the rules must be redefined for each content type. Even for the same content type, the rules may be different depending on the delivery channel. For example, news can be delivered using different standardized formats such as Rich Site Summary (RSS) and Open Content Syndication (OCS).

Before entering the content in a notification engine, the content must be adapted to establish a correspondence between the content and rules which have been defined. For example, if the rule is based on a keyword, the content received from the content provider must be adapted to contain this keyword. This adaptation must be done for each content type.

The above drawbacks have a major impact for the service provider in terms of integration of new services and development costs.

OBJECTS AND SUMMARY OF THE INVENTION

It is an object of the present invention to allow service providers to deliver personalized content to users.

It is another object of the present invention to allow a service provider to dynamically generate a subscription interface to record users preferences.

It is a further object of the present invention to allow a service provider to dynamically generate at subscription time, notification rules according to users preferences.

It is another object of the present invention to allow a service provider to adapt the content received from a content provider to a notification engine.

It is yet another object to allow a service provider to easily offer new content in its notification services.

These and other objects are attained in accordance with one embodiment of the invention wherein there is provided a method for delivering personalized notifications to at least one user the method comprising the steps of receiving a content description from a content provider, the content description defining, for a piece of content received from the content provider, at least one keyword, the at least one keyword having at least one attached value, and a localization of the at least one attached value in the piece of content, recording the at least one attached value and at least one delivery channel selected by the user each time a subscription request for a notification service related to the content description, is received from the user, generating a notification rule associated with the user based on the selected at least one attached value and the localization, adapting the piece of content related to the content description to comply with the notification rule each time the piece of content is received from the content provider, and checking for each localization, the adapted piece of content against the notification rule each time the piece of content is received from the content provider and for each rule previously generated.

In accordance with another embodiment of the invention there is provided a system for delivering personalized notifications to at least one user, the system comprising means for receiving a content description from a content provider, the content description defining, for a piece of content received from the content provider, at least one keyword, the at least one keyword having at least one attached value, and a localization of the at least one attached value in the piece of content, means for recording the at least one attached value and at least one delivery channel selected by the user each time a subscription request for a notification service related to the content description is received from the user, means for generating a notification rule associated with the user based on the selected at least one attached value and the localization, means for adapting a piece of content related to the content description to comply with the notification rule each time the piece of content is received from the content provider, and means for checking the adapted piece of content against the notification rule each time the piece of content is received from the content provider for each notification rule previously generated.

In accordance with another embodiment of the invention there is provided a computer program product to deliver personalized notifications to at least one user, the computer program product comprising a computer readable medium, first program instruction means for receiving a content description from a content provider, the content description defining, for a piece of content received from the content provider, at least one keyword, the at least one keyword having at least one attached value, and a localization of the at least one attached value in the piece of content, second program instruction means for recording the at least one attached value and at least one delivery channel selected by the user each time a subscription request for a notification service related to the content description is received from the user, third program instruction means for generating a notification rule associated with the user based on the selected at least one attached value and the localization, fourth program instruction means for adapting a piece of content related to the content description to comply with the notification rule each time the piece of content is received from the content provider, and fifth program instruction means for checking the adapted piece of content against the notification rule each time the piece of content is received from the content provider for each notification rule previously generated and wherein the first, second, third, fourth, and fifth program instruction means are recorded on the medium.

BRIEF DESCRIPTION OF THE DRAWINGS

FIGS. 2a-2c illustrate a method for service providers to deliver personalized event notifications to end-users according to an embodiment of the present invention;

DETAILED DESCRIPTION OF THE INVENTION

For a better understanding of the present invention, together with other and further objects, advantages and capabilities thereof, reference is made to the following disclosure and the appended claims in connection with the above-described drawings.

Figure 1:
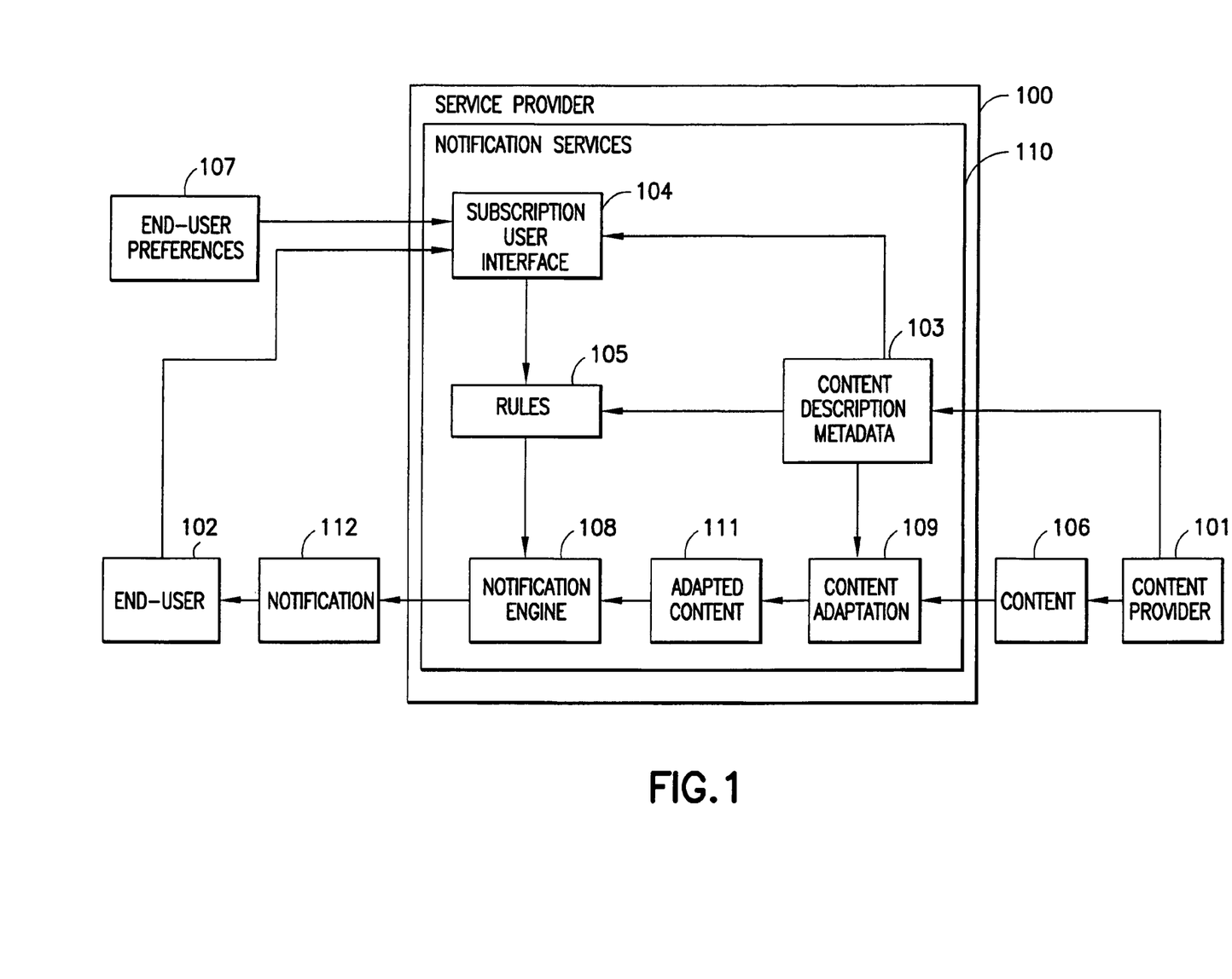
FIG. 1 is a block diagram of an embodiment of the present invention.

FIG. 1 illustrates the relationships between the service provider 100, its notification services 110, the content provider 101 and the end-user 102 according to an embodiment of the present invention.

Prior to selection of any end-user preferences 107 and any transmission of content 106, the content provider 101 sends to the service provider 100 a content description metadata 103. In a preferred embodiment, content description metadata 103 are sent in an XML document.

The service provider 100 uses this content description metadata 103 to personalize a generic subscription user interface 104 and to record the end-user's preferences 107 selected at subscription time.

The service provider 100 uses the content description metadata 103 and the end-user's preferences 107 to dynamically generate a notification rule 105 corresponding to the content 106.

A piece of content 106 delivered by the content provider 101 is generally included in an XML document. The piece of content 106 can be sent by the content provider 101 or retrieved by the service provider 100. Generally, the piece of content 106 is sent or pushed by the content provider 101.

The service provider 100 uses the content description metadata 103 to adapt 109 the content 106 submitted by the content provider CP 101 to the notification services 110 and more particularly to the notification engine 108 of the notification services 110.

The present invention is based on a content description metadata 103 submitted by the content provider 101 to the service provider 100. In a preferred embodiment, the content provider 101, as content 106 owner, provides this content description metadata 103.

Upon reception of the content description metadata 103 sent by the content provider 101, the service provider 100 uses the keywords names, keywords values, and hierarchical relationships between these keywords as defined in the content description metadata 103 to personalize a generic subscription user interface 104 for recording, at subscription time, the end-users' preferences 107.

Upon the subscription of a new end-user 102 by means of the subscription user interface 104 previously generated, the service provider 100 uses the localization information defined in the content description metadata 103 and the end-user's preferences 107 to dynamically build a rule 105 corresponding to this specific content.

As soon as the new piece of content 106 is available, the service provider 100 uses the localization information defined in the content description metadata 103 to adapt 109 the piece of content 106 received from the content provider 101 into adapted content 111 adapted to the notification engine 108 used by the notification service 110 to notify 112 the end user 102.

Figure 2A:
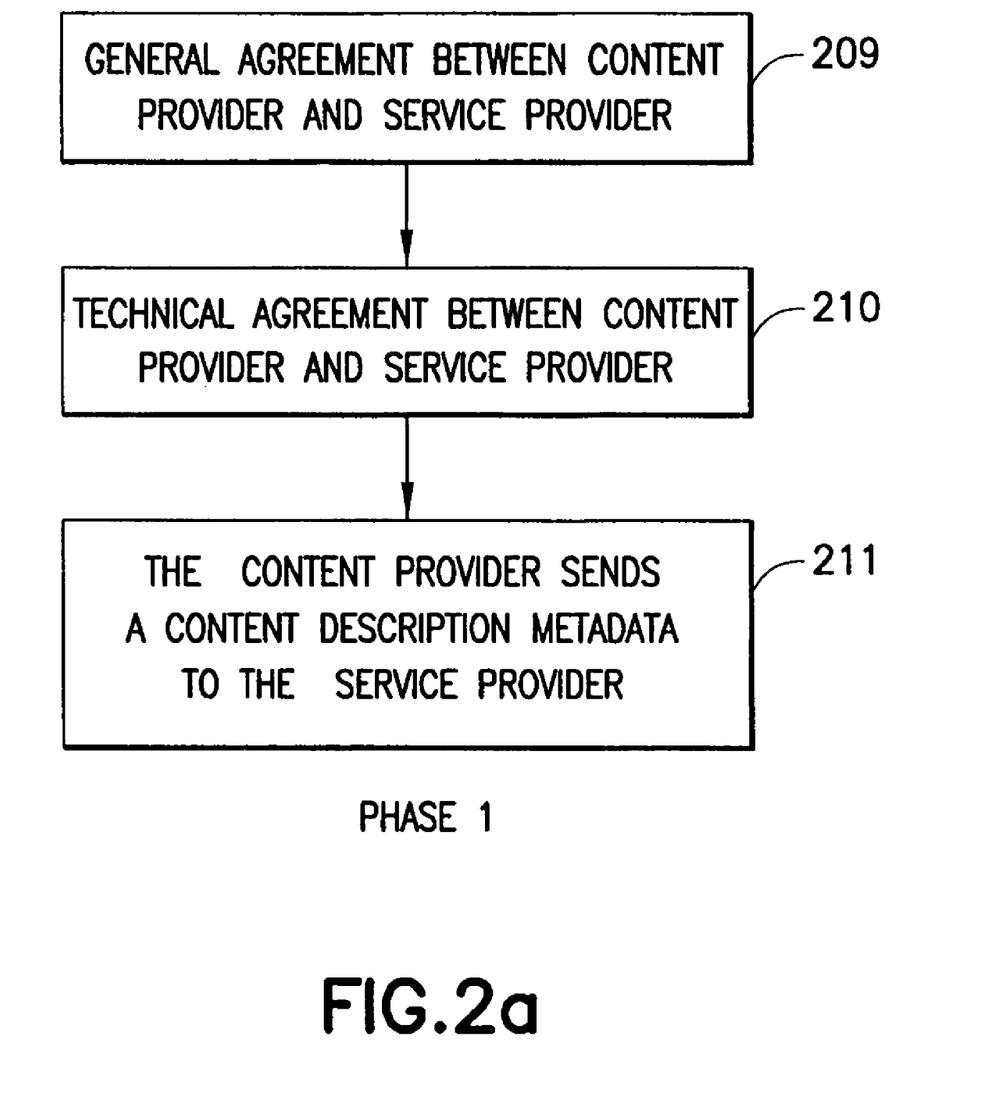
FIG. 2a is a flow chart illustrating the first phase of the method for delivering personalized event notifications to end-users according to an embodiment of the present invention.
Figure 2B:
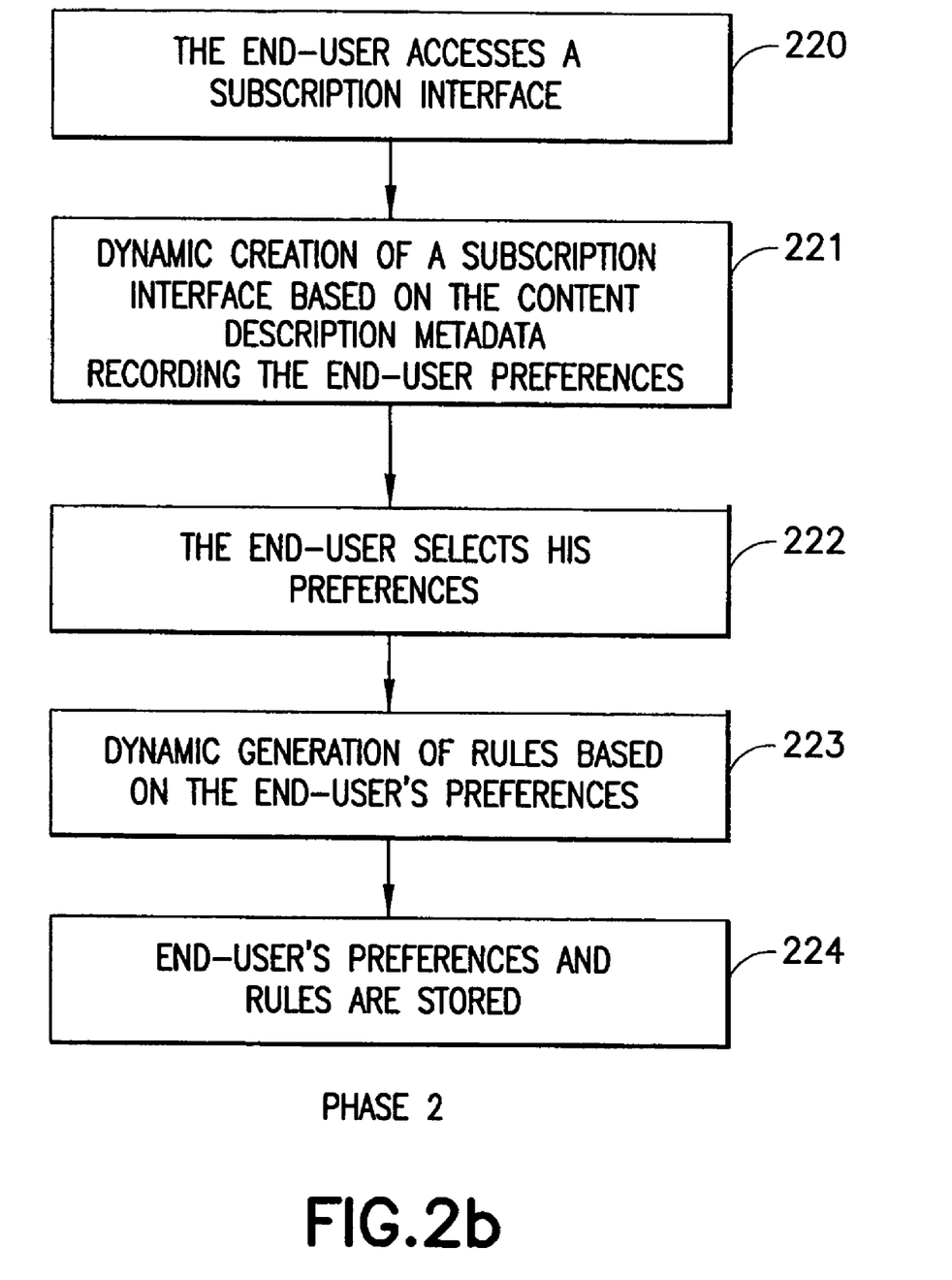
FIG. 2b is a flow chart illustrating the second phase of the method for delivering personalized event notifications to end-users according to an embodiment of the present invention.
Figure 2C:
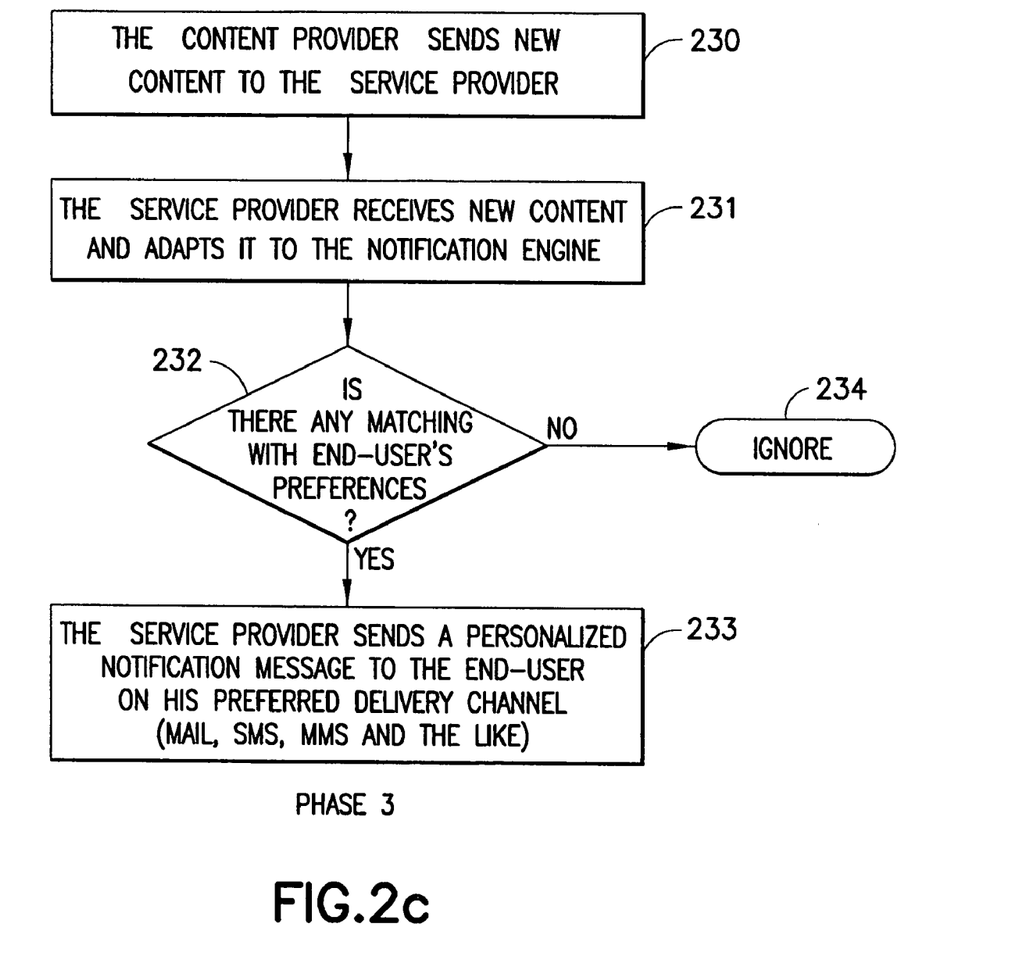
FIG. 2c is a flow chart illustrating the third phase of the method for delivering personalized event notifications to end-users according to an embodiment of the present invention.

FIGS. 2a-2c illustrate the method for a service provider 100, to deliver personalized event notifications 112 to end-users 102. The method, according to a preferred embodiment of the invention, comprises three main phases.

The first phase illustrated in FIG. 2a, relates to the creation of a content description metadata 103. First the content provider 101 and the service provider 100 define a general agreement (step 209). This general agreement comprises the type (e.g., news, mail, and the like) of the content 106 that will be sent by the content provider 101 to the service provider 100, the format (e.g., RSS, OCS, and the like) of the content 106 that will be sent by the content provider 101 to the service provider 100, the pricing model, and the like.

Second, the content provider 101 and the service provider 100 define a specific or technical agreement (step 210). This technical agreement comprises for each piece of content 106 a list of possible keywords defined by their name, a set of values attached to these keywords, hierarchical relationships between these keywords, and a localization of the values attached to each keyword in a piece of content 106 (e.g., related to a specific event).

Once a general agreement is defined between the service provider 100 and the content provider 101, the content provider 101 creates a content description metadata 103 corresponding to the technical agreement and sends it to the service provider 100 (step 211). In a preferred embodiment, this content description metadata 103 has the form of a simple XML file.

The second phase illustrated in FIG. 2b, relates to the subscription by an end-user 102 to a new content notification service 110 proposed by the service provider 100. After subscription, the end-user 102 is informed through his preferred delivery channel, each time new content 106 will be available or each time an event corresponding to one of his preferences occurs.

First, the end-user 102 takes out a subscription to the new content notification service 110. This new content notification service 110 is proposed by the service provider 100, but the content 106 is provided by the content provider 101. For that purpose, the end-user 102 accesses, on his own initiative, a subscription interface 104 (step 220). The end-user 102 may be informed of this service via an advertising mail sent by the service provider 100 or by means of any other information means.

A generic user interface is dynamically personalized based on the content description metadata 103. The subscription user interface 104 is personalized by the service provider 100 at subscription time and is presented to the end-user 102 so that he can enter his preferences 107 (step 221).

Using the personalized user interface 104, the end-user 102 selects his preferences 107 in terms of content and delivery channel (step 222). He selects one or more values associated with keywords that present an interest for him and how he wishes to be informed. The way he will be informed depends on the service provider 100 capabilities. It can be a simple mail, a SMS (Short Message Services) message on his mobile phone, a MMS (Multimedia Message Services) message, a WAP (Wireless Application Protocol) Push message, a phone call on his mobile phone, and the like.

Based on the localization information extracted from the content description metadata 103 associated with each keyword and the end-user's preferences 107, the service provider 100 dynamically generates a rule 105 that will be used by the notification engine 108 to notify the end-user 102 each time a new piece of content 106 corresponding to the end-user's preferences 107 is received (step 223).

The rules 105 and the selected end-user's preferred delivery channels are stored in a persistent manner (e.g., in a database). They will be used by the notification engine 108 each time a new piece of content 106 is received from the content provider 101 (step 224).

The last phase, illustrated in FIG. 2, is triggered each time the content provider 101 sends a new piece of content 106 to the service provider 100. The content provider 101 sends a new piece of content 106 to the service provider 100 (step 230). The piece of content 106 is received by the service provider 100 and is automatically adapted to the notification engine 108 to comply with the rules 105 previously generated (step 231). This adaptation process, required by the notification engine 108, must be executed for each piece of content 106. The notification engine 108 checks the adapted piece of content 111 with regard to the rules 105 previously generated and stored for each end-user 102 (step 232). This checking phase can be provided by a standard intelligent notification engine. If a match occurs between the values of the keywords as defined in the rules 105 and the values found in the adapted content 111, the end-user 102 is automatically notified through the delivery channel selected during the subscription step (step 233). If no match occurs, then the system ignores the content for this end-user 102 (step 234). Each time a new piece of content 106 is received by the service provider 100, the same steps are processed.

Figure 3:
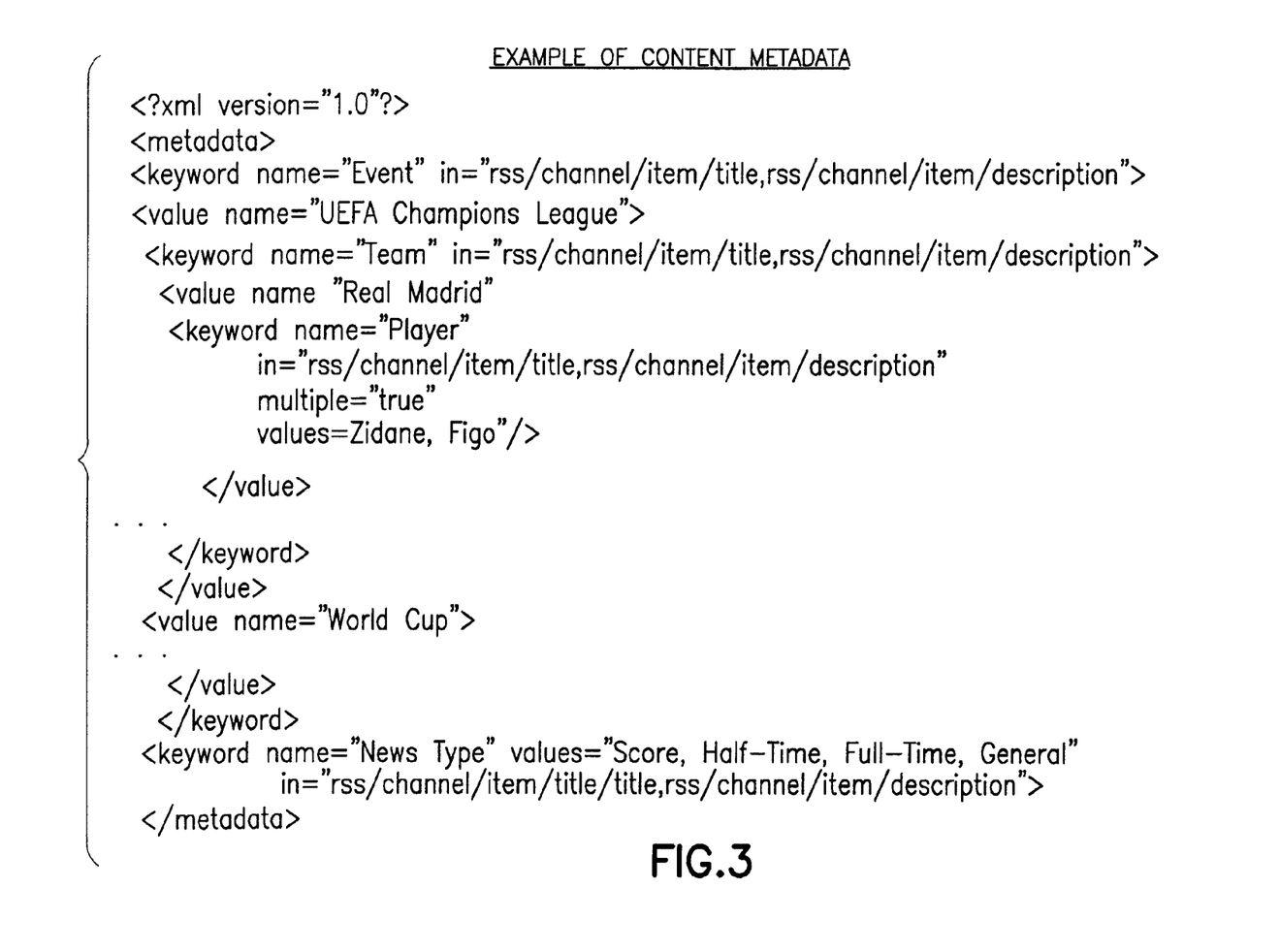
FIG. 3 shows an example of content description metadata according to an embodiment of the present invention.

If a service provider 100 wants to integrate a new notification service 110 (e.g., a football news service directed to a specific competition such as the European cups) and offer a subscription to this new service to any end-users 102, a negotiation phase starts between the service provider 100 and the content provider 101. During this phase, some technical (e.g., type and format) and economic elements are discussed. The present invention adds an additional requirement. The content provider 101 must provide the service provider 100 with a content description metadata 103 of the content 106 that will be sent. FIG. 3 shows a typical XML document comprising a content description metadata 103. The content description metadata 103 is sent once by the content provider 101 to the service provider 100. A content description metadata 103 includes one or more keywords. Each keyword is defined by a name. Possible keywords are "Event", "Team", "Player", and "News Type". A set of values is attached to each keyword that may be found in each piece of content. Possible values for the keyword "Event" are "World Cup", "UEFA Championship", "French League 1", and the like. Possible values for the keyword "Team" are "Real Madrid", "Juventus", "Milan A.C", "Inter Milan", and the like. Possible values for the keyword "Player" are "Zidane", "Figo", "Raul", "Ronaldo", and the like. Possible values for the keyword "News Type" are "Score", "Half-time", "Full-time", "General", and the like.

A content description metadata 103 also includes a hierarchical description of the relationships between the keywords (e.g., a "Team" like "Real Madrid" is part of a specific "Event" like "UEFA Championship", but is not part of an "Event" like "World Cup" and a "Player" like "Zidane" is a member of a specific "Team" like "Real Madrid").

A content description metadata 103 also includes a localization of the values attached to each keyword in the content (e.g., if the content is delivered as a RSS document, the values of the keywords can be found in the "title" tag or in the "description" tag of an "item" tag, within the "channel" tag contained in the "rss" tag). This localization can be expressed in a XPath notation by "rss/channel/item/title" or "rss/channel/item/description".

Finally, a content description metadata 103 includes an indication for each keyword whether or not the choice of several values is allowed. The attribute "multiple" of the "keyword" tag indicates whether or not several values can be attached to a same keyword name as is the case for the keyword "Player".

In a preferred embodiment of the invention, the content description metadata 103 is described in an XML document. The format (e.g., syntax) of this XML document can be part of a discussion and part of the general agreement between the service provider 100 and the content provider 101. It is possible for the parties to define a XML Schema or a Document Type Definition for the XML file.

Based on the content description metadata 103, a generic user interface is dynamically personalized for each end-user subscription. The hierarchical description defined in the content description metadata 103 is represented through one or more trees, one tree for each top-level keyword. Each node in each tree represents a keyword at a certain level of the hierarchy. A first screen displays "root nodes" of the trees. The "root nodes" represent the top-level keywords at the top of the hierarchy with their associated values. Nodes associated with nodes of higher level in the hierarchy are defined as "child nodes". Each selection by a end-user 102 of a keyword value leads to the display of the child nodes associated with the selected node (if any).

Figure 4:
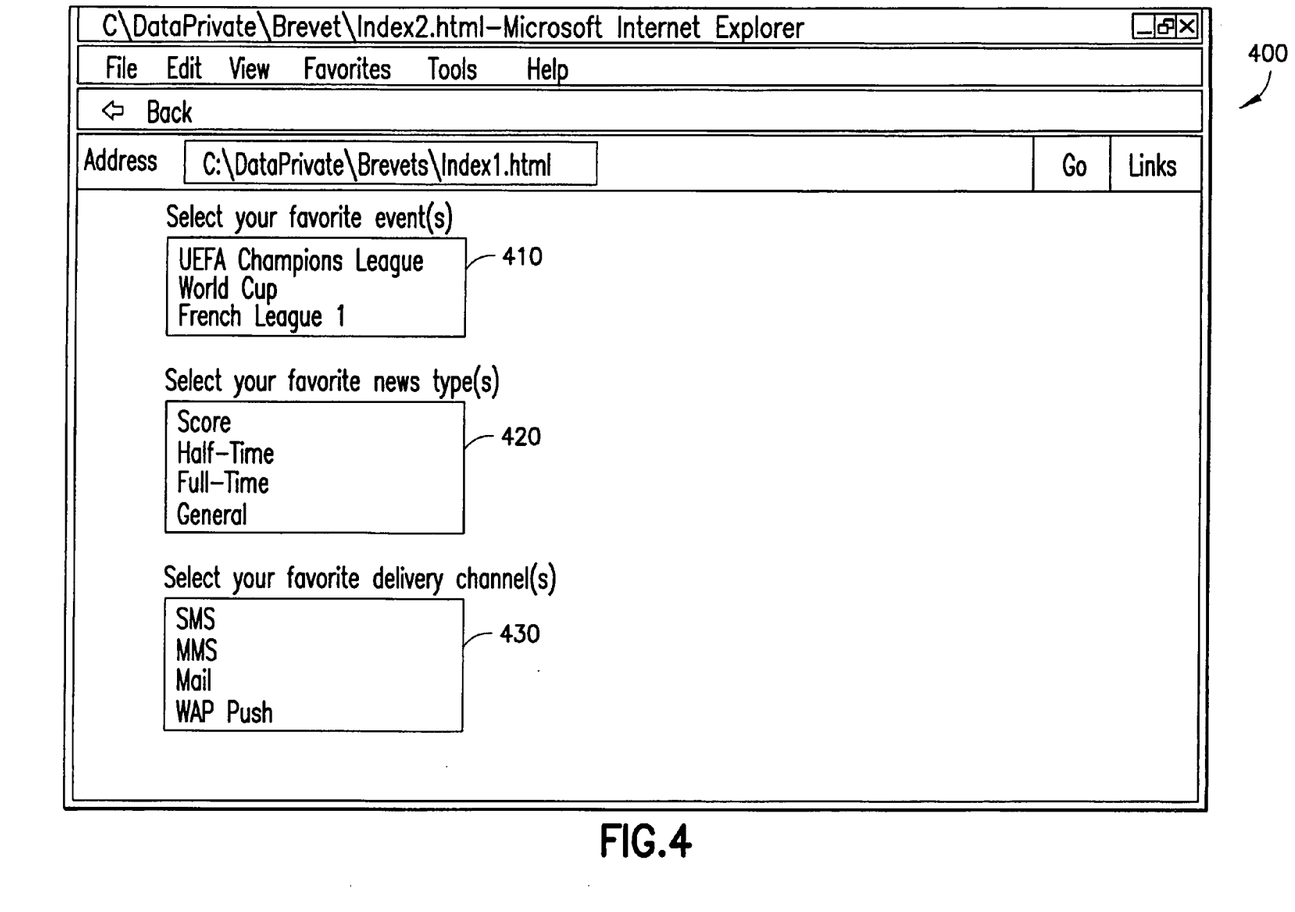
FIGS. 4-5 show an example of a dynamically generated subscription user interface according to an embodiment of the present invention.

FIG. 4 shows a first screen 400 of the subscription user interface 104 related to previously described football news service. The two top-level nodes corresponding to the top-level keywords "Event" 410 and "News Type" 420 are displayed with all of the possible values and with all of the possible delivery channels 430 offered by the service provider 100 notification services 110.

Figure 5:
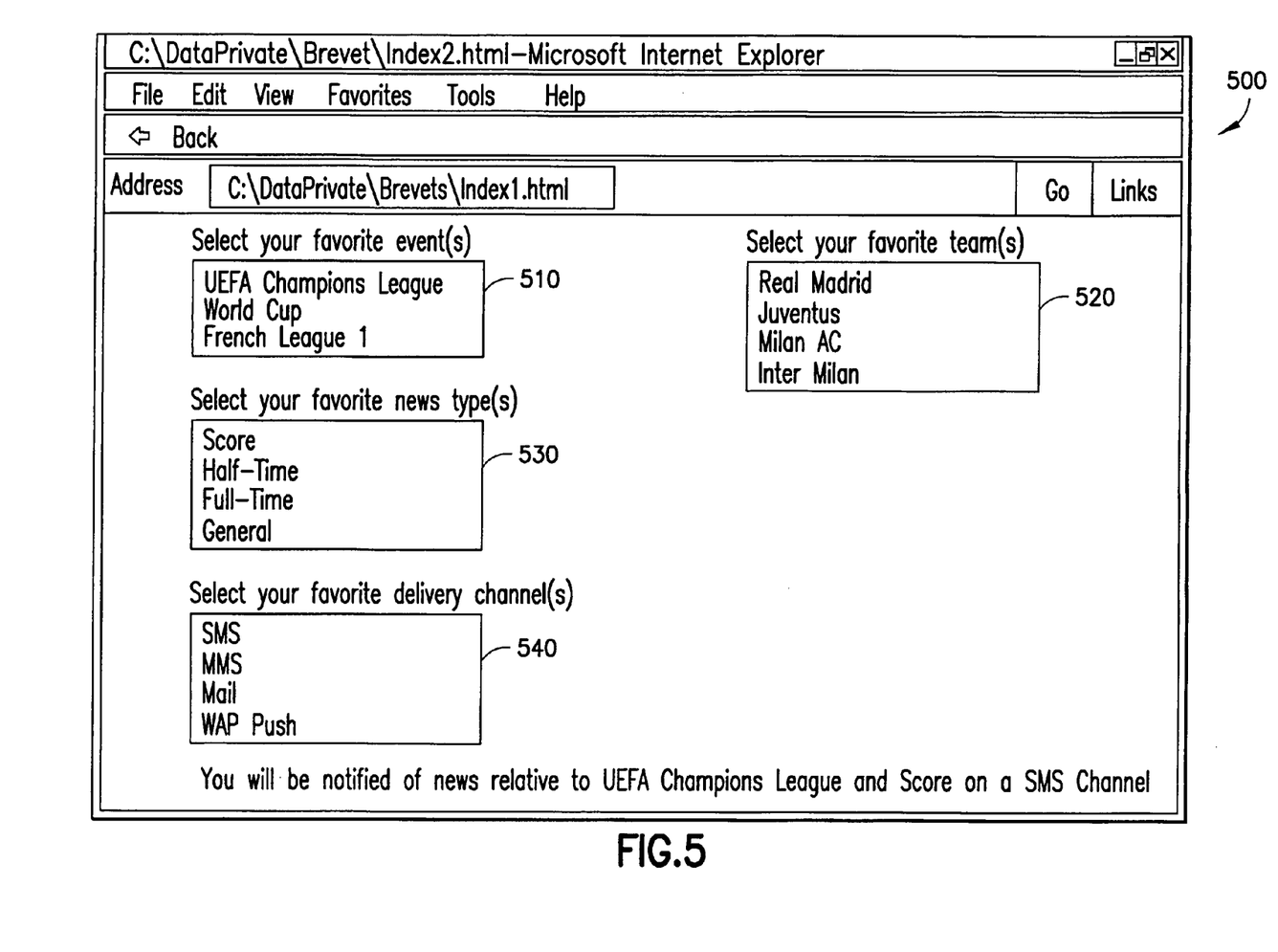

FIG. 5 shows the screen 500 of the subscription user interface 104 after selection of an event 510 and a news type 530. The next node 520 in the hierarchy of the "Event" tree is displayed. The user can now select his favorite teams. Nothing appears under the node "News Type" 530 because "News Type" is defined as being a "leaf" (there is no child nodes). The possible delivery channels 540 offered by the service provider 100 notification services 110 are also displayed.

This process is repeated until reaching the leaf of each branch.

The end-user's preferences 107 and the localization in the control description metadata 103 of the values attached to each keyword enable the service provider 100 to dynamically build rules 105 that will be used by the notification engine 108 to notify the end-users 102.

For instance, the end-user 102 can choose "UEFA Champions League" as "Event", "Real Madrid" as "Team" and "Score" as "News Type" as shown in FIG. 5. Since in the content description metadata 103 corresponding to FIG. 3, the localization of the "Event" keyword has the value "rss/channel/item/title" or "rss/channel/item/description", the localization of the "Team" keyword has the value "rss/channel/item/title" or "rss/channel/item/description", and the localization of the "News Type" keyword localization has the value "rss/channel/item/title" or "rss/channel/item/description", the following rule 105 can be automatically generated:

```
((rss/channel/item/title like 'UEFA Champions League') OR
(rss/channel/item/description like 'UEFA Champions
League')) AND
((rss/channel/item/title like 'Real Madrid') OR
(rss/channel/item/description like 'Real Madrid')) AND
((rss/channel/item/title like 'Score') OR
(rss/channel/item/description like 'Score'))
```

This rule 105 is naturally deduced from the end-user's preferences 107. It is possible to define another rule 105 that will omit the "Event" keyword in order to notify a larger range of end-users 102:

```
((rss/channel/item/title like 'Real Madrid') OR
(rss/channel/item/description like 'Real Madrid')) AND
((rss/channel/item/title like 'Score') OR
(rss/channel/item/description like 'Score'))
```

The generation of rules 105 depends on the service provider's 100 implementation and will not be further described.

Each piece of content 106 received by the service provider 100 from the content provider 101 must be adapted 109 to the service provider's notification engine 108 interface to match the generated rules 105. Once again, the content description metadata 103 enables a generic adaptation due to the localization in the content 106 of the values associated with the keywords. The format of the adapted piece of content 111 depends on the notification engine 108 interface. The adapted piece of content 111 should preferably at least refer to the keywords used in the generated rules 105 to enable the matching process. The localization of the values associated with the keywords has been previously used for dynamically generating the rules 105.

In the previous example, the rule was the following:

```
((rss/channel/item/title like 'UEFA Champions League') OR
(rss/channel/item/description like 'UEFA Champions
League')) AND
((rss/channel/item/title like 'Real Madrid') OR
(rss/channel/item/description like 'Real Madrid')) AND
((rss/channel/item/title like 'Score') OR
(rss/channel/item/description like 'Score')).
```

The adapted piece of content 111 could have the following XML form:

```
<rss/channel/item/title>Scores from UEFA Champions League
at Half-Time </rss/channel/item/title>
<rss/channel/item/description>Real Madrid scores one goal
against Arsenal during the first
half-time.</rss/channel/item/description>
```

Once the generated rules 105 associated with the end-user subscriptions are generated and stored in the service provider's 100 notification system, the adapted piece of content 111 can be checked referring to these rules 105. If a correspondence occurs, a notification 112 is sent to the user 102.

In the present example, with the rule 105 previously defined and with the adapted piece of content 111, there is a match because the title comprises the value "UEFA Champions League" and the value "Score" and the description comprises the value: "Real Madrid".

The advantages of the present invention are multiple. The first and probably the most important advantage from the service provider 100 standpoint is significant reduction of the development cost. The subscription user interface 104, the rules 105, and the content adaptation 109 are automatically processed using the content description metadata 103 associated with the content 106 provided by the content provider 101. The definition and exchange of content description metadata 103 adds a step during the negotiation phase between the content provider 101 or service provider 100 but the advantages generated by sending this content description metadata 103, highly overcomes the cost of this exchange. The subscription user interface 104 offered by the service provider 100 at subscription time represents an undeniable ergonomic improvement from a user standpoint.

The subscription user interface 104 presented to the end-user 102 is dynamically personalized from a generic user interface, based on content description metadata 103 initially sent by the content provider 101 to the service provider 100.

The service provider 100 has to develop a subscription user interface 104 only once. Therefore the development effort is drastically reduced.

Since the-end user 102 can only choose a predefined set of values from the subscription user interface 104, the risk to enter inconsistent values is much lower. This is an obvious advantage from an ergonomic standpoint.

Rules 105 used by the notification engine 108 are dynamically built from the end user's preferences 107 entered at subscription time and from the content description metadata 103 received from the content provider 101. The algorithm to generate these rules is the same for all content. For this reason, the development effort for the service provider 100 is drastically reduced.

Content adaptation 109 is automatically done based on localization information defined in the content description metadata 103. For this reason, the adaptation algorithm is the same for each content type. This is an obvious advantage for the service provider 100 from an economic standpoint.

The invention is thus deemed to constitute a significant advancement in the art.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method for delivering personalized notifications to at least one user for at least one delivery channel selected by said user, said method comprising the steps of:
   receiving a content description from a content provider, said content description defining, for a piece of content received from said content provider, at least one keyword, said at least one keyword having at least one attached value, and a localization of said at least one attached value in said piece of content, wherein said content description comprises hierarchical relationships between each corresponding said keyword;
   recording said at least one attached value and said at least one delivery channel selected by said user each time a subscription request for a notification service related to said content description, is received from said user;
   generating a notification rule associated with said user based on said selected at least one attached value and said localization;
   adapting said piece of content related to said content description to comply with said notification rule each time said piece of content is received from said content provider; and
   checking for each localization, said adapted piece of content against said notification rule each time said piece of content is received from said content provider and for each rule previously generated; and
   delivering personalized notifications to said user.

2. The method according to claim 1 wherein said recording step includes a preliminary step of generating a user interface based on said received content description.

3. The method according to claim 2 wherein said generating step includes a step of personalizing a generic user interface based on said at least one keyword, said at least one attached value and said hierarchical relationships included in said received content description.

4. The method according to claim 1 wherein, a hierarchical level is defined in said content description for said at least one keyword, each keyword of lower hierarchical level being associated with a keyword of higher hierarchical level.

5. The method according to claim 3 wherein said personalizing step includes a further step of displaying said hierarchical relationships through a plurality of trees, one tree for each top level keyword, each keyword value selected by said user resulting in the display of the values of one or a plurality of keywords of lower level associated with the keyword corresponding to the selected value.

6. The method according to claim 1 wherein said content description includes an indication for said at least one keyword whether or not the choice of several values is allowed.

7. The method according to claim 1 including a preliminary step of specifying a content type and a content format.

8. The method according to claim 1 wherein said content description is an XML (extended Markup Language) document.

9. The method according to claim 1 wherein said adapting step comprises a further step of adapting said piece of content based on said localization.

10. The method according to claim 1 wherein said checking step comprises a further step of sending a notification to said user associated with said notification rule, through at least one of said delivery channels if a match occurs between the values as defined in said notification rule and the values found in the adapted piece of content.

11. The method according to claim 1 wherein said checking step comprises a further step of ignoring said piece of content if no match occurs between the values as defined in said notification rule and the values found in said adapted piece of content.

12. The method according to claim 1 wherein said checking step is executed by means of a standard notification engine.

13. A system for delivering personalized notifications to at least one user for at least one delivery channel selected by said user, said system comprising:
   means for receiving a content description from a content provider, said content description defining, for a piece of content received from said content provider, at least one keyword, said at least one keyword having at least one attached value, and a localization of said at least one attached value in said piece of content, wherein said content description comprises hierarchical relationships between each corresponding said keyword;
   means for recording said at least one attached value and said at least one delivery channel selected by said user each time a subscription request for a notification service related to said content description is received from said user;
   means for generating a notification rule associated with said user based on said selected at least one attached value and said localization;
   means for adapting a piece of content related to said content description to comply with said notification rule each time said piece of content is received from said content provider; and
   means for checking said adapted piece of content against said notification rule each time said piece of content is received from said content provider for each notification rule previously generated; and
   means for delivering personalized notifications to said user.

14. A computer program product to deliver personalized notifications to at least one user for at least one delivery channel selected by said user, said computer program product comprising:

a computer readable medium;

first program instruction means for receiving a content description from a content provider, said content description defining, for a piece of content received from said content provider, at least one keyword, said at least one keyword having at least one attached value, and a localization of said at least one attached value in said piece of content, wherein said content description comprises hierarchical relationships between each corresponding said keyword;

second program instruction means for recording said at least one attached value and said at least one delivery channel selected by said user each time a subscription request for a notification service related to said content description is received from said user;

third program instruction means for generating a notification rule associated with said user based on said selected at least one attached value and said localization;

fourth program instruction means for adapting a piece of content related to said content description to comply with said notification rule each time said piece of content is received from said content provider;

fifth program instruction means for checking said adapted piece of content against said notification rule each time said piece of content is received from said content provider for each notification rule previously generated; and sixth program instruction means for delivering personalized notifications to said user and wherein said first, second, third, fourth, fifth and sixth program instruction means are recorded on said medium.

* * * * *